United States Patent
Lindblom et al.

(10) Patent No.: US 9,265,345 B2
(45) Date of Patent: Feb. 23, 2016

(54) GONDOLA SHELF WIRE ROUTING TRAY

(71) Applicant: Streater LLC, Alberta Lea, MN (US)

(72) Inventors: Thomas G. Lindblom, Claremont, MN (US); Wayne Lee Jensen, Ellendale, MN (US); David W. Linn, Alden, MN (US)

(73) Assignee: Streater LLC, Albert Lea, MN (US)

( * ) Notice: Subject to any disclaimer, the term of this patent is extended or adjusted under 35 U.S.C. 154(b) by 0 days.

(21) Appl. No.: 13/938,954

(22) Filed: Jul. 10, 2013

(65) Prior Publication Data

US 2014/0263109 A1  Sep. 18, 2014

Related U.S. Application Data

(60) Provisional application No. 61/800,057, filed on Mar. 15, 2013.

(51) Int. Cl.
  *A47B 97/00* (2006.01)
  *F16L 3/02* (2006.01)
  *H02G 3/04* (2006.01)
  *A47F 5/10* (2006.01)

(52) U.S. Cl.
  CPC ............... *A47B 97/00* (2013.01); *A47F 5/101* (2013.01); *F16L 3/02* (2013.01); *H02G 3/0437* (2013.01); *A47B 2097/003* (2013.01); *Y10T 29/49863* (2015.01)

(58) Field of Classification Search
  CPC ............... F16L 3/00; F16L 3/01; F16L 3/02; F16L 3/06; H02G 3/263; H02G 3/281; H02G 3/0437; A47B 2097/003

USPC ............ 211/113, 119.003, 126.1, 133.6; 248/48.1, 49, 58, 60, 317, 59; 174/68.1, 68.3

See application file for complete search history.

(56) References Cited

U.S. PATENT DOCUMENTS

| 4,511,107 | A | * | 4/1985 | Funk ........................... 248/74.1 |
| 5,024,251 | A | * | 6/1991 | Chapman ....................... 138/92 |
| 5,240,209 | A | * | 8/1993 | Kutsch ........................... 248/49 |
| 5,322,480 | A | * | 6/1994 | Meier et al. ................... 474/145 |
| 5,663,527 | A | * | 9/1997 | Hui ............................... 174/68.3 |
| 5,962,814 | A | | 10/1999 | Skipworth et al. |
| 6,206,331 | B1 | | 3/2001 | Keith et al. |

(Continued)

FOREIGN PATENT DOCUMENTS

| GB | 2402310 A | 1/2004 |
| WO | WO 9962045 A1 | 12/1999 |
| WO | WO 2007064979 A2 | 6/2007 |

OTHER PUBLICATIONS

Madix lighting & electrical, Madix, Inc., pp. 24-29, Apr. 10, 2012, http://www.easygondola.com/Images/document/Madix_elec.pdf.

*Primary Examiner* — Stanton L Krycinski
(74) *Attorney, Agent, or Firm* — DLA Piper LLP (USA); Jennifer Lacroix

(57) ABSTRACT

A gondola shelf wire routing tray includes a trough adapted to receive a wire. A pair of shelf mount tabs are attached to the trough. A wire constraint tab is mounted to the trough and adapted to secure the wire in the trough. The trough is flexible so that the trough may be deformed to permit the pair of shelf mount tabs to move through perforations of a shelf. As a result, the shelf mount tabs are locked into engagement within the perforations and the trough is mounted to the shelf as the trough attempts to spring back to its original shape.

10 Claims, 6 Drawing Sheets

(56) References Cited

U.S. PATENT DOCUMENTS

| | | |
|---|---|---|
| 6,234,429 B1 | 5/2001 | Yang |
| D450,564 S * | 11/2001 | Kane et al. .................... D8/356 |
| 6,399,883 B1 * | 6/2002 | Lhota ........................... 174/101 |
| 6,567,602 B2 * | 5/2003 | Cole et al. .................... 385/136 |
| 6,742,746 B1 * | 6/2004 | La Scola et al. ................ 248/49 |
| 7,041,898 B2 * | 5/2006 | Stempinski et al. .......... 174/488 |
| 7,304,865 B2 | 12/2007 | Warburton |
| 7,418,812 B2 * | 9/2008 | Ikeda et al. .................... 59/78.1 |
| 7,515,806 B2 * | 4/2009 | Zellak et al. ................... 385/137 |
| 7,718,894 B2 * | 5/2010 | Blase ........................... 174/68.1 |
| 7,888,608 B2 | 2/2011 | Hybiske et al. |
| 7,922,129 B2 * | 4/2011 | Rapp et al. .................... 248/68.1 |
| 8,488,936 B2 * | 7/2013 | Sayres .......................... 385/137 |
| 8,613,411 B1 * | 12/2013 | Mohns et al. ................. 248/74.3 |
| 2007/0235212 A1 * | 10/2007 | Waldorf et al. ............... 174/209 |
| 2009/0077942 A1 * | 3/2009 | Utaki ............................. 59/78.1 |
| 2011/0286152 A1 | 11/2011 | Wolinsky et al. |

* cited by examiner

GONDOLA SHELF WIRE ROUTING TRAY

CLAIM OF PRIORITY

This application claims priority to U.S. Provisional Patent Application No. 61/692,054, filed Aug. 22, 2012, the contents of which are hereby incorporated by reference, and U.S. Provisional Patent Application No. 61/800,057, filed Mar. 15, 2013, the contents of which are hereby incorporated by reference.

FIELD OF THE INVENTION

The present invention relates to store fixture gondolas and, more particularly, to gondola shelves when wiring to the shelves is required for electrical accessories added to the gondola such as for electronic goods, lighting or electronic vendor displays.

BACKGROUND

Shelving systems and gondolas are used in retail environments to display goods for sale. It is often desirable to provide electrical power to the goods on the shelves or to features such as lighting or electronic vendor displays. This requires running numerous electrical wires to each shelf of the system or gondola, and the wires are typically bundled together. Bundled wires from all of the shelves are cluttered and obvious to the customer when viewing shelves, and present a disorganized and unpleasant appearance.

A solution for generally enclosing wire routings on shelf systems and gondolas is needed. Such a wire routing solution would preferably be quick and easy to install on existing shelf systems and gondolas.

SUMMARY OF EMBODIMENTS

Embodiments of the gondola shelf wire routing tray of the invention include a simple snap-on solution for enclosing wire routings. More specifically the gondola shelf wire routing tray is a snap on trough that is integrated into and under the shelf assemblies to conceal wire routing. The tray includes fold over tabs to secure and conceal wire in the wire trough and mounting tabs that include elongated vertical portions and horizontal portions mounted near the ends of the wire trough to secure the wire routing tray to new or existing shelf perforations.

The gondola shelf wire routing tray, with routing wires installed and tabs folded over to lock the wires in place, is pressed up against the gondola shelf braces on the undersides of the shelves. The ends of the tray are pushed upward towards the shelf top, by applying pressure on the ends of the tray toward the shelf. This flexes the ends of the tray upward, with respect to the central portion of the tray. As a result, the horizontal portions of the mounting tabs slide and snap into shelf perforations. Pressure is then released to lock the tray in place, concealing wire routings under the gondola shelf.

DETAILED DESCRIPTION OF EMBODIMENTS

Figure 1:
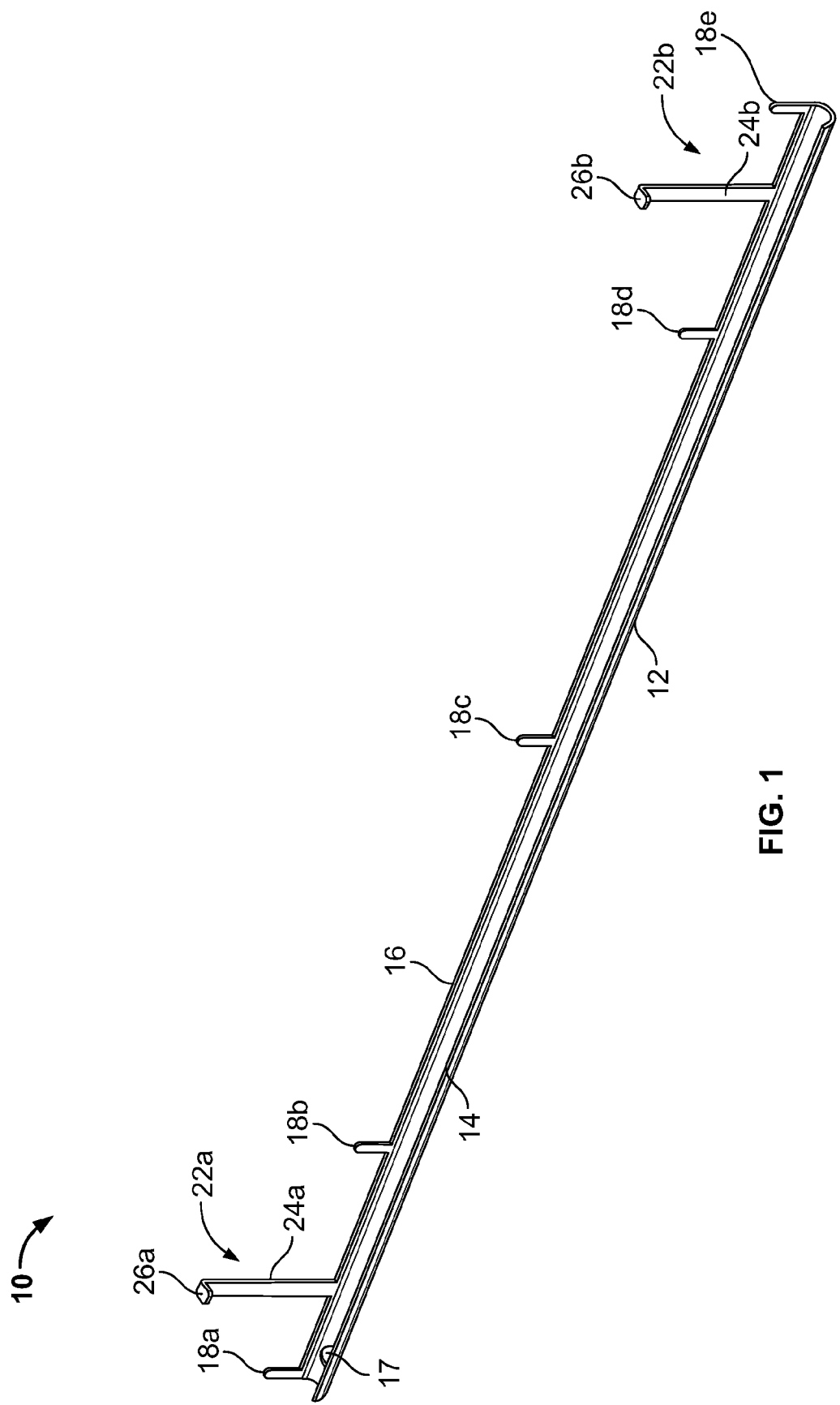
FIG. 1 is a top perspective view of an embodiment of the wire routing tray of the present invention showing the radius trough, shelf mount tabs and wire constraint tabs.

An embodiment of the wire routing tray of the invention is indicated in general at 10 in FIGS. 1-4. With reference to FIG. 1, the wire routing tray 10 includes an elongated trough 12. The trough preferably features a general U-shaped or arcuate cross-section with open ends and an open top. As a result, a pair of elongated trough top edges 14 and 16 are defined. The trough may optionally be provided with a recess 17 (also shown in FIGS. 5 and 6) to improve strength and rigidity.

A number of wire constraint tabs 18a-18e are attached to trough top edge 16. While five wire constraint tabs are illustrated, the tray could feature a greater or lesser number. In addition, some or all of the wire constraint tabs could be attached to trough top edge 14. As explained in greater detail below, the wire constraint tabs 18a-18e operate to secure and conceal wire in the wire tray.

Tray 10 also includes a pair of shelf mount tabs, indicated in general at 22a and 22b in FIG. 1. Shelf mount tab 22a features an elongated hanging portion 24a and an engagement portion 26a. Shelf mount tab 22b also features an elongated hanging portion 24b and an engagement portion 26b. As will be explained in greater detail below, the shelf mount tabs are used to attach the tray to the shelf of a gondola or shelving system.

The trough 12 is formed in a semi-rigid, flexible fashion so that it may spring back to its original shape if deformed slightly (in the manner described below). In addition, the tray 10 overall is preferably formed as a single piece, but it could optionally be constructed from a number pieces that are joined together. The tray is preferably formed from a single piece of metal. Materials other than metal could be used in the construction of the tray. As an example only, the tray could be constructed with a plastic trough with metal wire constraint tabs attached to the trough by adhesive, fasteners or molded into the plastic trough.

Use and operation of the wire routing tray 10 of FIG. 1 will now be explained.

Figure 2:
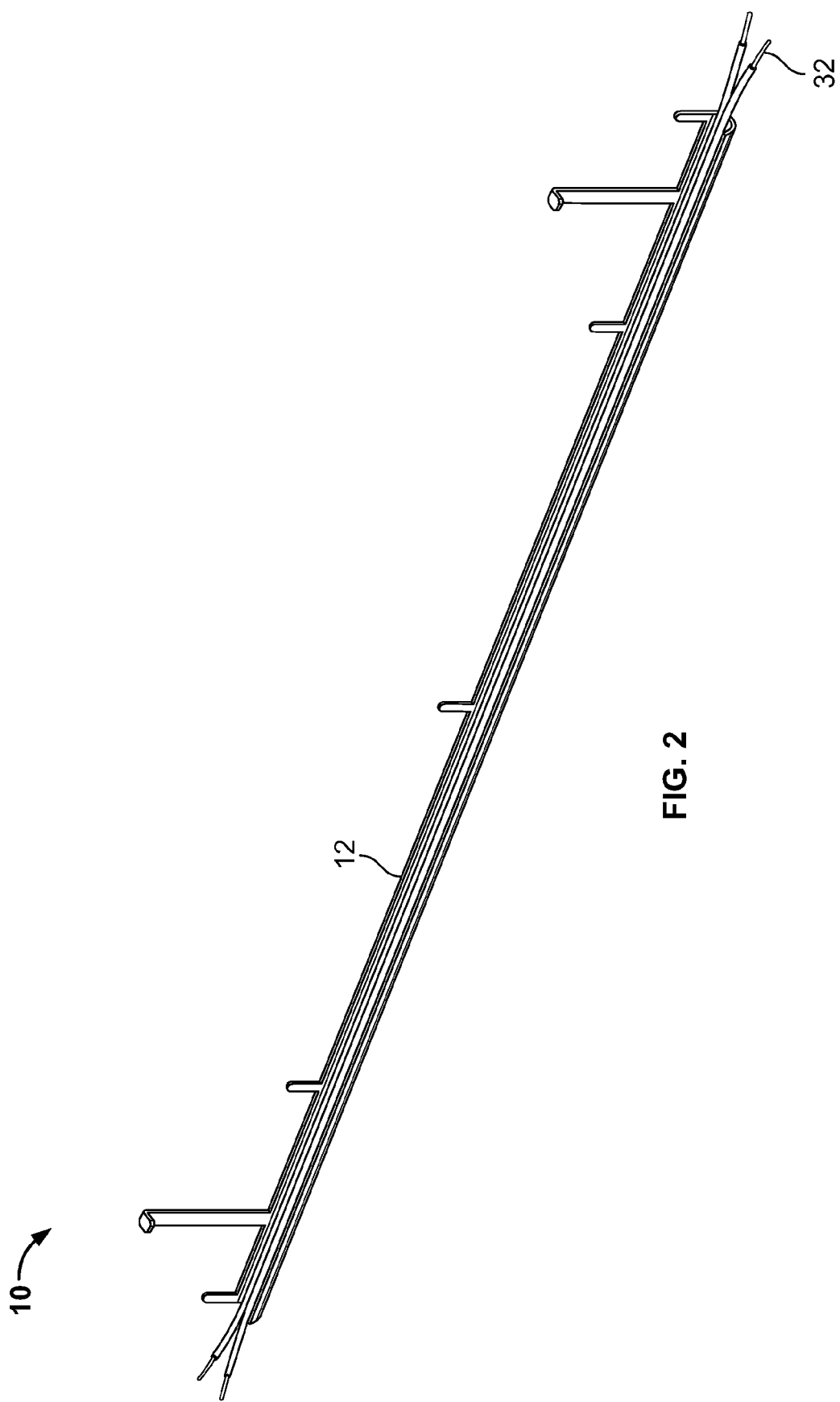
FIG. 2 is a top perspective view of the wire routing tray of FIG. 1 with electrical wires routed in the tray.
Figure 3:
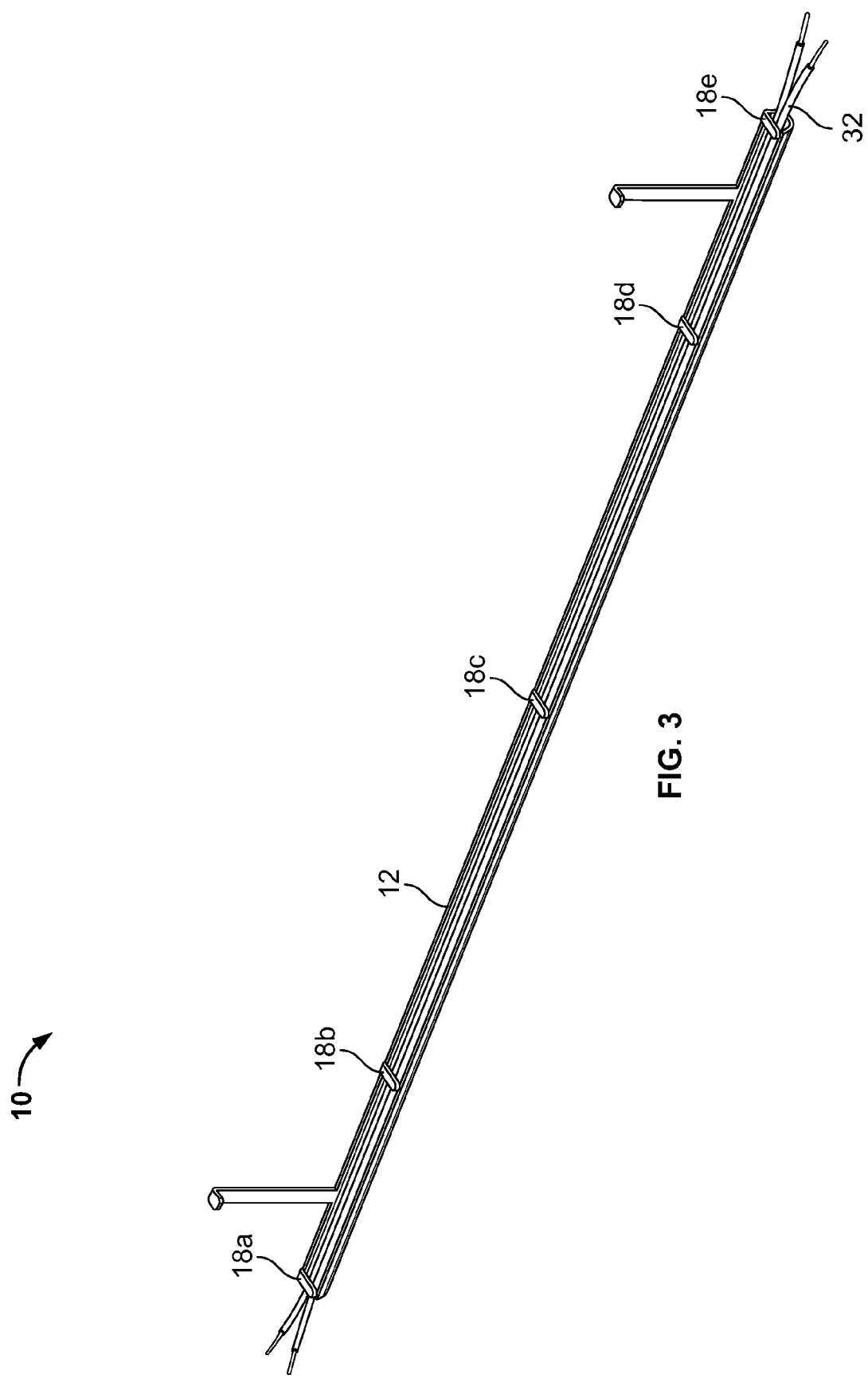
FIG. 3 is a top perspective view of the wire routing tray of FIGS. 1 and 2 with electrical wires routed in the tray and wire constraint tabs bent or folded over to constrain the electrical wires in the trough.

As illustrated in FIG. 2, electrical wires 32 are initially placed in the trough 12 of the tray 10. Next, as illustrated in FIG. 3, the wire constraint tabs 18a-18e are bent or folded over to constrain the wires 32 within the trough 12. It should be noted that in an alternative embodiment, the wire constraint tabs could be pre-formed over the trough with a gap or split through which the wire may pass into the trough. The end portions of the electrical wires are free to extend out of the open ends of the trough 12. The wire tray is now ready to be attached to the underside of the shelf of a shelf system or gondola.

Figure 4:
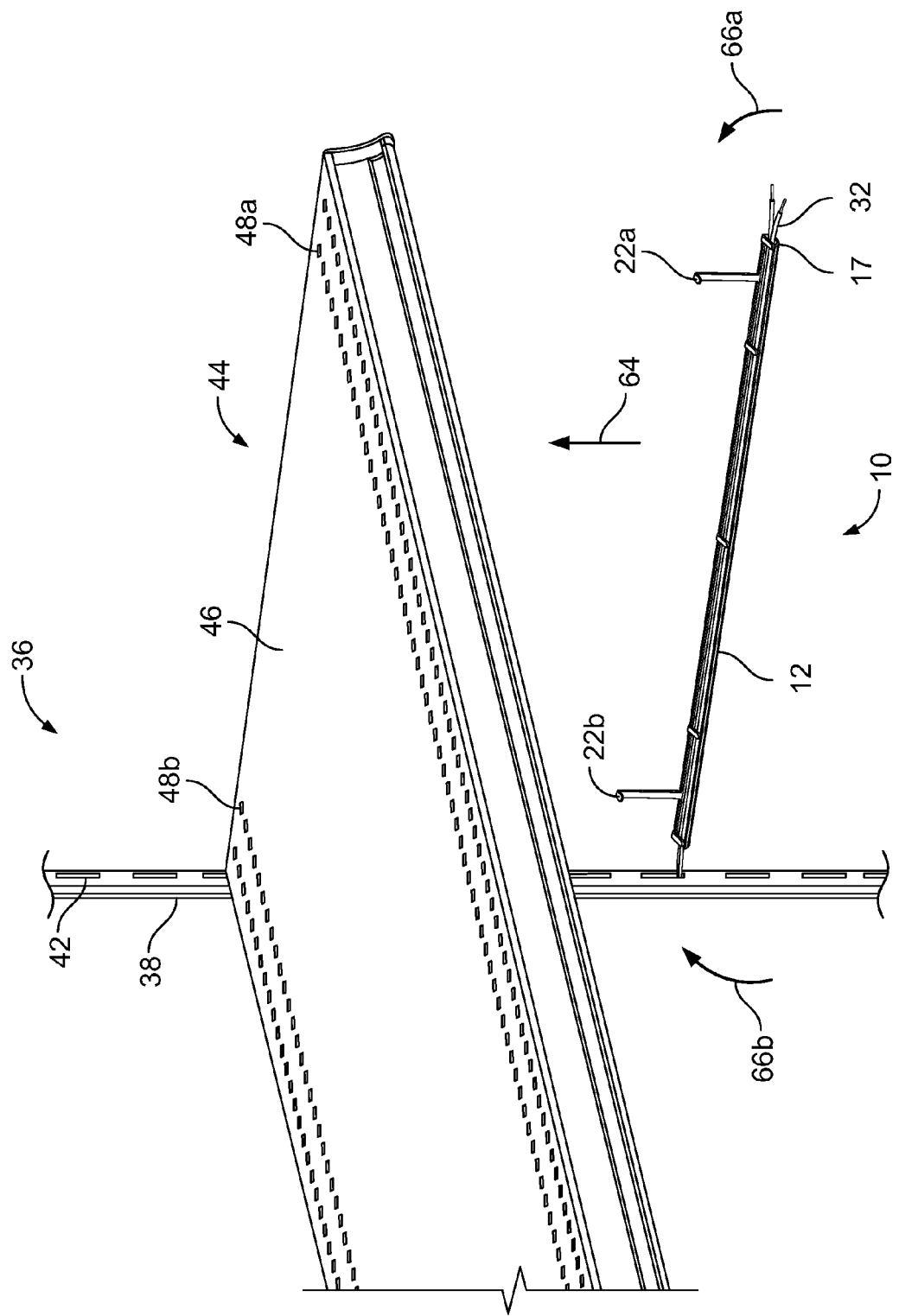
FIG. 4 is a partially exploded, top perspective view of a gondola upright and shelf including the wire routing tray of FIGS. 1-3 as it is to be installed to the gondola shelf.
Figure 5:
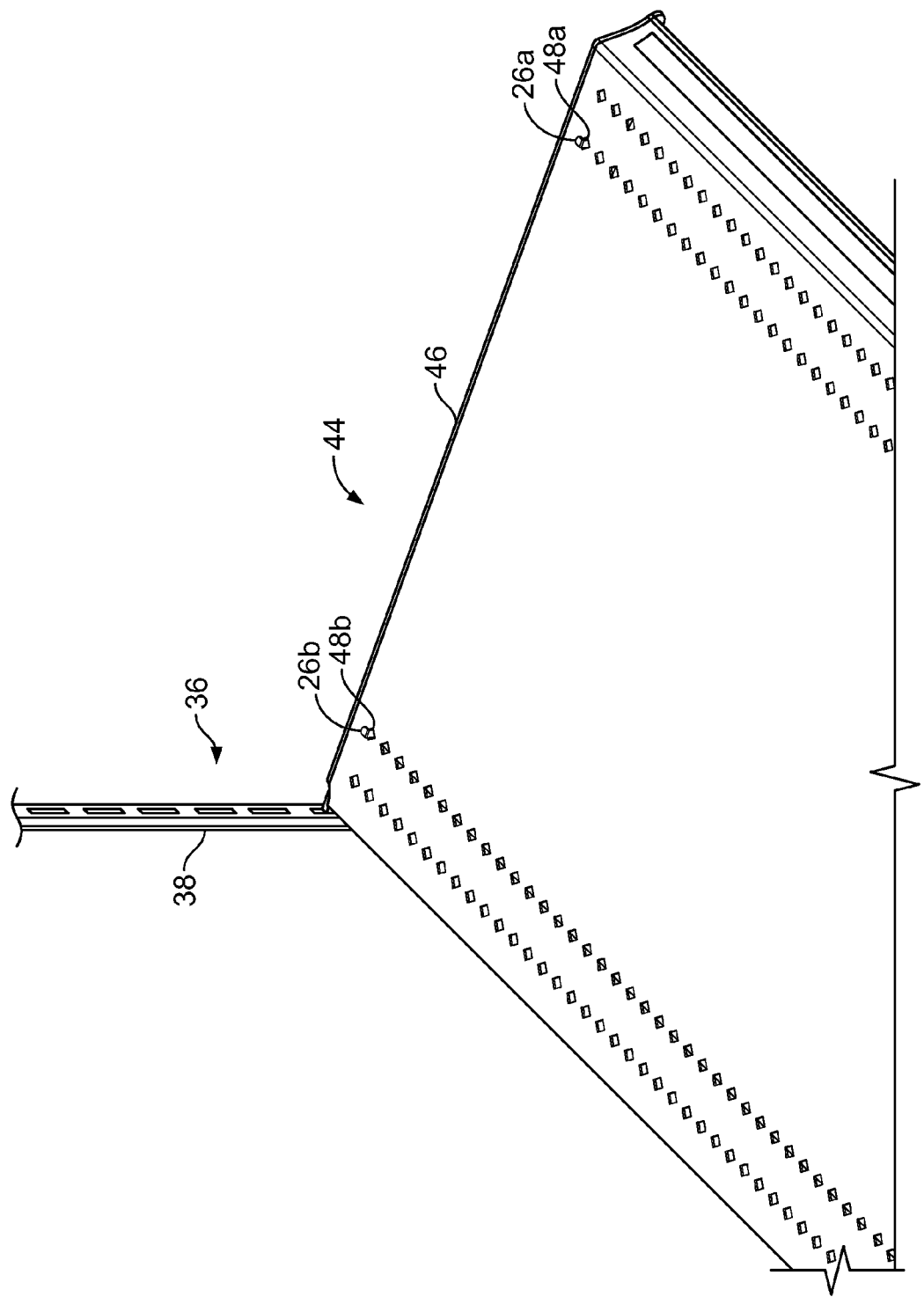
FIG. 5 is a top perspective view of the routing tray mounting tabs of the wire routing tray of FIGS. 1-4 as they are mounted to the shelf perforations.
Figure 6:
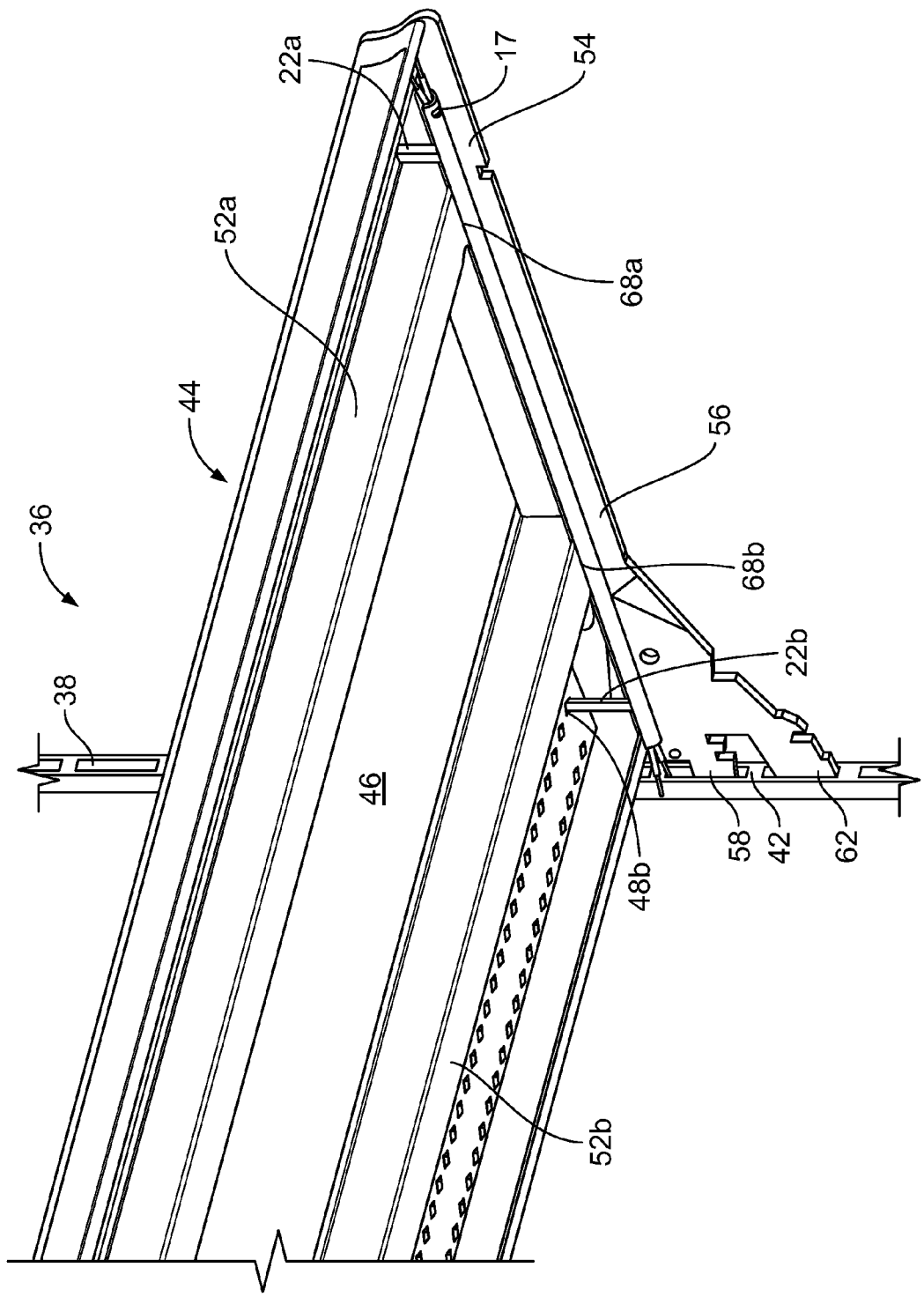
FIG. 6 is a bottom perspective view of the wire routing tray of FIGS. 1-5 mounted to the gondola shelf.

An example of a portion of a shelf system or gondola suitable for use with the wire routing tray 10 of FIGS. 1-3 is indicated in general at 36 in FIGS. 4-6. The gondola includes an upright 38 that features elongated slots 42. In addition, the gondola includes a shelf, indicated in general at 44. The shelf features a shelf surface or pan 46 which is provided with perforations 48a and 48b.

As illustrated in FIG. 6, and known in the art, the shelf 44 is provided with a pair of hats or braces 52a and 52b that are attached to a shelf end piece 54. The braces 52a and 52b and end pieces 54 cooperate to support the underside of the shelf pan 46. A bracket 56, which may be part of end piece 54, features a pair of hook tabs 58 and 62 which engage the elongated slots 42 of the upright 38 to support the shelf 44 on the upright 38.

As is known in the art, the opposite end portion of the shelf 44 (not shown in FIGS. 4-6) features a construction similar to what is illustrated in FIGS. 4-6. In addition, the gondola typically features at least a second upright, that is similar to upright 38, supporting the end portion of the shelf not shown in FIGS. 4-6. Furthermore, as is known in the art, the uprights may be mounted to a wall or other generally vertical surface, or may be supported on a generally horizontal surface by a base, legs or the like.

To install the wire routing tray 10 to the gondola, the tray, with wires 32 therein, is positioned underneath the shelf 44, as illustrated in FIG. 4, and moved upwards, as illustrated by arrow 64. This movement continues until the trough contacts the hats or braces 52a and 52b of FIG. 6. The ends of the trough 12 are then pushed upward towards the shelf top, by applying pressure on the ends of the trough toward the shelf, as illustrated by arrows 66a and 66b in FIG. 4. This causes the central portion of the tray to press up against the gondola shelf hats or braces (FIG. 6) flexing the ends of the tray upward so that the trough is deformed slightly. As a result, the engagement portions 26a and 26b and top portions of hanging portions 24a and 24b of shelf mount tabs 22a and 22b may be moved upwards through corresponding perforations 48a and 48b. The wire routing tray 10 is locked into the position illustrated in FIGS. 5 and 6 by releasing pressure on the tray ends so that, as the trough attempts to spring back to its original shape, the engagement portions 26a and 26b and top portions of hanging portions 24a and 24b of shelf mount tabs 22a and 22b engage the edges of the perforations 48a and 48b, as illustrated in FIG. 5. The wire routing tray 10 is also constrained against the shelf hat or braces 52a and 52b, as illustrated at 68a and 68b in FIG. 6. As a result, the trough may be maintained in a slightly deformed configuration. The tray is thus snapped into place so as to conceal wire routings under the gondola shelf.

As a result, and in view of the above, according to various embodiments of the present invention, a snap on gondola shelf wire routing tray is provided that may be applied to new or existing gondola shelves for clean routing of electrical wiring. The gondola shelf wire routing tray allows cleanup of existing routings or added to new shelf wiring applications for clean electrical routings.

While the preferred embodiments of the invention have been shown and described, it will be apparent to those skilled in the art that changes and modifications may be made therein without departing from the spirit of the invention, the scope of which is defined by the appended claims.

What is claimed is:

1. A gondola shelf wire routing tray comprising:
   a. a trough adapted to receive a wire, said trough having opposite end portions and a first elongated sidewall having a first elongated trough top edge and a second elongated sidewall having a second elongated trough top edge, said first and second elongated trough top edges running between the opposite end portions and opposing each other;
   b. a pair of shelf mount tabs attached one each to the opposite end portions of the trough on the first elongated trough top edge, said opposing second elongated trough top edge being free of shelf mount tabs, each of said pair of shelf mount tabs having a hanging portion and an engagement portion with the hanging portion having a bottom end mounted to the first elongated trough top edge and a top end attached to the engagement portion where the engagement portion extends from the hanging portion at generally a right angle;
   c. a wire constraint tab mounted to the trough and adapted to secure the wire in the trough; and
   d. said trough being flexible so that the trough can be deformed about a lateral axis to permit the pair of shelf mount tabs to move towards one another and through perforations of a shelf so that the shelf mount tabs are locked into engagement within the perforations and the trough is mounted to the shelf as the trough attempts to spring back to its original shape.

2. The gondola shelf wire routing tray of claim 1 wherein the trough features an open top and the wire constraint tab is constructed of a bendable material so that it can be folded over the open top of the trough to secure the wire therein.

3. The gondola shelf wire mounting tray of claim 1 further comprising a plurality of additional wire constraint tabs.

4. The gondola shelf wire mounting tray of claim 3 wherein the trough features an open top and the wire constraint tab and each of the plurality of additional wire constraint tabs is constructed of a bendable material so that they can be folded over the open top of the trough to secure the wire therein.

5. The gondola shelf wire mounting tray of claim 1 wherein the trough includes open ends.

6. The gondola shelf wire mounting tray of claim 1 further comprising a recess formed in the trough so that the strength of the trough is increased.

7. The gondola shelf wire mounting tray of claim 1 wherein the trough, pair of shelf mount tabs and wire constraint tab are constructed from a single piece of material.

8. The gondola shelf wire mounting tray of claim 7 wherein the material is metal.

9. The gondola shelf wire mounting tray of claim 1 wherein the trough features a generally U-shaped cross-section.

10. The gondola shelf wire mounting tray of claim 1 wherein the wire constraint tab is constructed of a bendable material and the trough features a generally U-shaped cross-section, wherein the wire constraint tab is mounted on the first elongated trough top edge or the second elongated trough top edge, and wherein the wire constraint tab is foldable from a first position where it extends in a direction away from the trough so that wire may be inserted into the trough to a second position over the open top of the trough to secure the wire therein.

\* \* \* \* \*